*N. J. Wyeth.*
*Ice Implement.*
Nº 7,163. 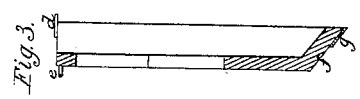 Patented Mar. 5, 1850.
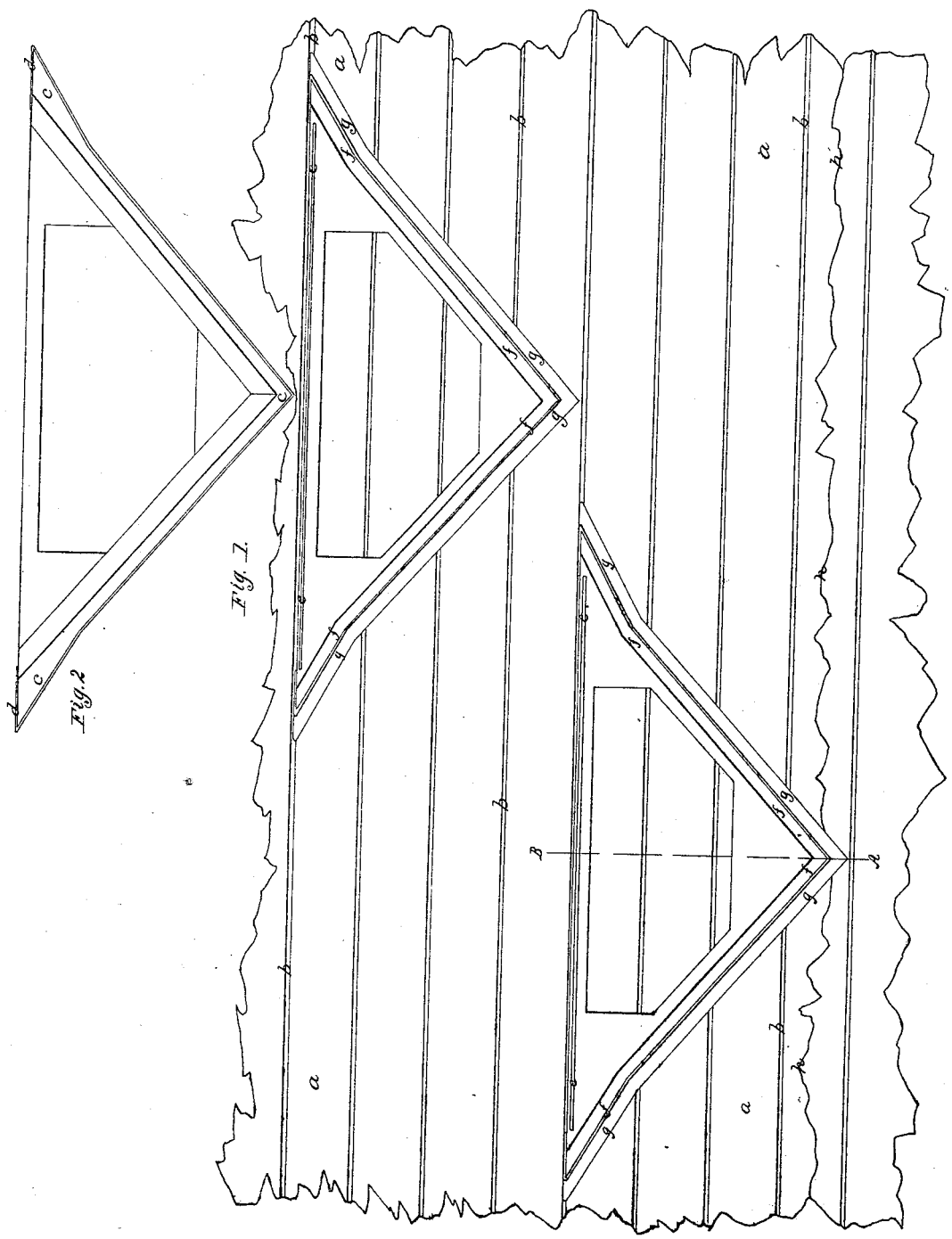

UNITED STATES PATENT OFFICE.

NATHANIEL J. WYETH, OF CAMBRIDGE, MASSACHUSETTS.

IMPROVED SCRAPER FOR REMOVING SNOW FROM ICE.

Specification forming part of Letters Patent No. 7,153, dated March 5, 1850.

*To all whom it may concern:*

Be it known that I, NATHANIEL J. WYETH, of Cambridge, in the county of Middlesex and State of Massachusetts, have invented a new and useful Machine or Implement to be used in the Process of Harvesting Ice, which I call an "Ice-Scraper," and which clears the snow from the top surface of the ice; and I do hereby declare that the following description, taken in connection with the accompanying drawings, hereinafter referred to, forms a full and exact specification of the same, wherein I have set forth the nature and principles of my said invention, by which it may be distinguished from others of a similar class, together with such parts as I claim and desire to have secured to me by Letters Patent.

The figures of the accompanying plate of drawings represent my improvements.

Figure 1 represents a top view of a surface of ice having a series of parallel grooves formed in it twenty-two inches distant from each other, with two of these scrapers arranged in working positions on the same. Fig. 2 is a plan of one of said scrapers inverted or turned upside down, and Fig. 3 is a transverse vertical section taken in the plane of the line A B, Fig. 1.

My ice scraper consists of a wooden frame of the form in outline nearly of an isosceles triangle, the surfaces of the two equal sides being beveled or chamfered off, so as to form an obtuse angle with the surface of the ice, and being faced with strips of iron for about half their width, the base of the triangular frame having at each end metallic guides which fit into the grooves of the ice, formed as shown in Fig. 1, and as hereinafter explained.

The scrapers for removing snow from ice which are now in use are simple straight surfaces (without guides to move in the grooves of the ice) of proper length and width set in a frame drawn by a horse or horses and working from the center of the area to be cleared to each side of the same, and of course after being passed from said center to said side it has to be drawn back again without any load for a second operation, which occasions a considerable waste of time.

By my improvements it will be seen from the sequel that the scraper works from one edge to the other of the area to be cleared and that it operates to clear the ice, whether moving in one direction or its opposite, and can be made to throw the snow at right angles to the direction in which it is drawn and over the edge or brink of the area to be cleared, which can now only be done by hand, and, furthermore, my triangular scraper, being guided by the grooves, as above suggested, keeps its proper position without any manual assistance and requires one man less than the ordinary scraper needs to manage it.

In Fig. 1, as hereinabove explained, the surface $a\,a\,a\,a$ of the ice is represented with a series of parallel grooves, $b\,b\,b\,b$, &c., which, for instance, may be about twenty-two inches apart. These grooves should be about two inches deep, and may be obtained by any of the mechanical means now in use, and known by the name of "markers" or "plows."

$c\,c$ is the base of the triangular scraper, on the outer side and at each end of which the metallic guides $d\,d$ are fixed, which fit into the grooves $b\,b\,b\,b$ and guide the scraper in its movements. Along the top of the base $c\,c$ is secured the elongated hasp $e\,e\,e\,e$, on which a shackle slides to either end of the same, according as the scraper is moved in one direction or the other, the draft chain or traces by which the horse draws being hooked to said shackle.

The two equal sides $f\,f\,f\,f$ of the triangular scraper are framed to the base of the same in any way sufficiently strong, and are beveled off, as before explained, and as shown in Fig. 3, having also the outer beveled faces protected with metallic strips $g\,g\,g\,g$, as shown in Figs. 1 and 2.

The altitude or width of the triangular scraper should be equal to that of four of the parallel strips of ice, grooved, as above stated, so that the scraper shall in passing in either direction clear the snow from the same. The inner surfaces of the sides $f\,f\,f\,f$ are also beveled about parallel to the outer surfaces, and this arrangement will press any little snow which gets under the scraper in the opposite direction to that which is moved by the outer faces of said sides. The sides near the connection with the base are bent a little, as shown in Figs. 1 and 2, so as to form an angle a little more acute with said base than the rest of said sides, in order the more effectually to prevent the snow from getting behind said base or beyond the influence of said sides.

The operation of the scraper is as follows:

Place the guides of one of the scrapers in the fourth groove from the brink of the ice and draw it forward, and the snow between that groove and the brink $h\,h\,h$ of the ice will be removed. Then if the guides of a second scraper be placed in the fourth groove from that in which those of the first travel, or in the eighth groove from the brink $h\,h\,h$, and the said scraper be drawn in the same direction as the former, it will clear the snow from the area between said fourth and eighth grooves and raise it in a ridge between the said fourth groove and the brink $h\,h\,h$, and if the two scrapers are made of such width as to be able to pass each other, as they should be, then the first scraper being moved back again it will carry the snow in the ridge over the brink $h\,h\,h$, as will be readily understood.

It will readily be seen from this explanation how several scrapers may be used at a time, or how a single one by being shifted successively into every fourth groove and forming the snow in ridges, and then going over it several times, said ridges will be thrown over the brink.

The mode of clearing the ice thus secured is much more expeditious and thorough than any which has heretofore been devised.

I have described the scraper as being formed in the shape of an isosceles triangle merely; but if varied from this it will still work, although the shape described is believed to be the preferable one.

Having thus described my improvements, I shall state my claim as follows:

What I claim as my invention, and desire to have secured to me by Letters Patent, is—

An ice-scraper constructed substantially as above described—that is, in the form of a triangle (so that in moving in either direction the snow will be thrown by the diagonal sides at right angles to the course of the scraper,) and the base having guides which move in grooves formed in the ice and control the motions of the implement, as hereinabove set forth.

In testimony that the foregoing is a true description of my said invention and improvements I have hereto set my signature this 28th day of January, A. D. 1850.

NATHL. J. WYETH.

Witnesses:
EZRA LINCOLN, Jr.,
JOEL GILES.